Patented Apr. 19, 1938

2,114,371

UNITED STATES PATENT OFFICE 2,114,371

METHOD OF REFINING ROSIN ESTERS

Joseph N. Borglin, Wilmington, Del., assignor to Hercules Powder Company, Wilmington, Del., a corporation of Delaware No Drawing. Original application November 2, 1931, Serial No. 572,731. Divided and this application June 8, 1937, Serial No. 147,147

8 Claims. (Cl. 260—99.40)

This invention relates to an improved method for refining rosin esters and more especially for removing color bodies from esters prepared from low grade rosins.

Wood and gum rosins consist primarily of abietic acid, but contain impurities of varying amounts, these impurities including both visible and latent color bodies, the latter, while not primarily influencing the color of freshly refined rosin, tending to darken on aging, especially in the presence of oxygen and an alkali. These latent color bodies are found to a small extent in certain low grades of gum rosin and generally in wood rosin. When esters are prepared from rosins containing either visible or latent color bodies, the color bodies appear in the esters, being ordinarily removable therefrom only by distillation, a process not usually feasible except with the lower aliphatic esters such as ethyl abietate.

The broad object of the present invention relates to the removal of color bodies, both visible and latent, from rosin esters by the use of selective solvents exhibiting high solvent power for the color bodies as compared with a solvent in which the ester is dissolved for treatment. Briefly, the process involves the treatment of a solution of ester by extracting the same with a solvent which, either at all times or under certain conditions, is immiscible with the ester solution.

When iron is absent from the esters, the extraction of the color bodies may be effected by phenol or resorcinol, solvents usable in the removal of color bodies from rosins. On the other hand, when the esters are contaminated with any appreciable amounts of iron, resulting, for example, from esterification in iron apparatus, these selective solvents are of substantially reduced effectiveness. It is found that in case iron is present the effectiveness of the extraction may be increased, even above the normal degree when iron is absent, by the preliminary, simultaneous, or subsequent treatment of the rosin ester by certain substances, the majority of which fall into the category of reducing agents. Even though iron is absent, the use of these additional substances frequently results in the improvement of the quality of the product or the reduction of the amount of extracting agent necessary to give some certain yield of refined product.

In the preferred methods of carrying out the invention, the ester, if free from iron, is dissolved in some suitable medium, such as gasoline, petroleum ether, naphtha, kerosene, or the like, and the liquid, solvent of the color bodies, e. g. phenol or resorcinol, is added to the solution and brought into intimate contact therewith by agitation of the mixture at a temperature at which the liquids are substantially immiscible, or by the formation of a homogeneous solution through elevation of the temperature of the mixture. Intimate contact of the liquid, solvent of the color bodies, with the ester solution permits the extracting liquid to selectively dissolve the color bodies, the greater part of the ester, at least, remaining in solution in the liquid solvent thereof. After effecting intimate contact between the liquids, they are permitted to separate, after reduction of temperature, if they were put into solution or in any event if rapidity and completeness of separation is desired. As a result of the separation of the two liquids, one will contain essentially the ester in solution and the other will contain essentially the color bodies in solution. The ester, refined and freed from the color bodies dissolved in the liquid solvent thereof, may be readily recovered by evaporating the solvent from the separated ester solution.

Alternatively, where the liquid, solvent of the color bodies, is also a solvent of the ester, the ester containing the color bodies may be dissolved in the liquid, and another immiscible liquid, solvent of the rosin but less solvent of the color bodies added. The two liquids are in this case, also, intimately contacted and then separated, contact being effected by agitation at a temperature at which they are substantially immiscible, or by the formation of a homogeneous solution through elevation of the temperature of the mixture. The ester is recovered from the solution in the liquid preferentially solvent of the ester.

In general, in carrying out the process, the color bodies are somewhat soluble in the liquid used primarily as an ester solvent, and the ester is somewhat soluble in the extracting liquid. As a result after admixture of the liquids and subsequent separation both the color bodies and ester are distributed between the solutions in accordance with the usual laws; that is, the relative amount of each in unit volumes of the two solutions will bear ratios proportional to their solubilities in the respective solvents. As is usual, therefore, complete extraction can only be attained by repeated treatments with, of course, some loss of ester. Furthermore, each solvent dissolves some of the other with a resulting increased tendency to dissolve a larger amount of the undesired substance. Since the mutual solubilities of the solvents in each other is decreased in general with decrease in temperature, most effective separation of the liquids is possible at lowered temperatures. As noted above, intimate admixture is sometimes produced by raising the temperature to a point where one liquid is completely soluble in the other to form a homogeneous mixture. Cooling to refrigeration temperatures may in such cases be necessary to obtain good separation.

When iron is substantially absent, the manipulation involved may take the form of any of the manipulations outlined in the patent to Kaiser and Hancock, No. 1,715,088, dated May 28, 1929; also the selective solvents may be phenol, resorcinol, or other phenols, or operable equivalents therefor. The selective solvent materials may be used either alone or, especially if solid, in solution in inert solvents. If iron is present in an ester, due, for example, to its preparation in iron apparatus, good results require some modification of the simple extraction methods outlined above. Briefly, the modification involves the use, in addition to the extracting solvent, of agents among which may be listed oxalic acid, boric acid, alkali hydrosulphite, etc. These agents may be used in several alternative manners. First, the agent, such as oxalic acid, in suitable solution, for example, in alcohol, may be agitated or refluxed with the ester solution, the solution of agent withdrawn, and then the ester solution may be extracted with a selective solvent in the ordinary manner as outlined above.

Secondly, the agent may be used simultaneously with the selective solvent. For example, resorcinol or phenol, and oxalic acid in admixture may be refluxed with a gasoline solution of the ester.

As a third alternative procedure, extraction in the ordinary manner may first be carried out followed by treatment of the ester solution with the agent. The ester solution may then be agitated and heated with an alcoholic solution of oxalic acid.

As will be understood, iron present in the rosin ester due, for example, to preparation of the ester in iron apparatus, will be present in the ferric form, which has a yellowish color and will correspondingly tinge the ester. As will also be understood, oxalic acid, boric acid, alkali hydrosulphite, etc. will act to convert ferric iron to the ferrous form, which is colorless.

To illustrate the refining methods indicated above, there may be cited various purification processes used upon different rosin esters. In the first instance the refining of esters from which iron was absent will be considered. In the various processes listed below the rosin esters graded B in color. Glycol esters were treated as follows:

*Example 1.*—300 grams of a 14% solution of glycol ester of rosin in gasoline and 40 grams of resorcinol were refluxed for one hour, cooled and separated. By evaporation of the gasoline solution a 21% yield of the glycol ester grading I in color was obtained.

*Example 2.*—300 grams of the above gasoline glycol ester solution, 14 grams of resorcinol and 1 gram of oxalic acid were refluxed for one hour, cooled and separated, evaporation of the gasoline solution giving a 50% yield of the glycol ester grading I in color.

*Example 3.*—300 grams of the same glycol ester solution as above and 30 grams of phenol were refluxed until a solution occurred, then cooled to 15° C. to effect separation of the phenol from the gasoline solution, evaporation of the gasoline solution giving a 45% yield of rosin ester grading H in color.

*Example 4.*—300 parts by weight of a 14% solution of a glycol rosin ester prepared from ethylene dichloride and sodium resinate grading D in color were refluxed with 14 parts by weight of resorcinol and 1 part by weight of oxalic acid for one hour, the mixture cooled to room temperature and purified, the gasoline solution decanted and evaporated leaving an 88% yield of glycol ester grading N in color.

*Example 5.*—The process similar to the above (Example 4), using 1 part by weight of sodium hydrosulphite in place of the oxalic acid gave an 87% yield of rosin ester grading N in color.

*Example 6.*—300 parts by weight of glycol ester solution, prepared by refluxing glycol and FF wood rosin with p-toluenesulphonic acid as the catalyst, and 40 parts of resorcinol were refluxed for one hour, cooled to room temperature, the gasoline solution of purified ester evaporated, giving a 21% yield of rosin ester grading I in color.

*Example 7.*—300 parts by weight of the same glycol ester solution as above were refluxed for one hour with 14 parts by weight of resorcinol and 1 part by weight of oxalic acid, separated as above giving a 50% yield of rosin ester grading I in color.

Similar processes carried out with glycerin esters of rosin grading B in color (ester gums), were as follows:

*Example 8.*—56 grams of ester gum, dissolved in gasoline to a 14% solution, and 56 grams of phenol were heated until a solution occurred, 12 grams of water then added and the mixture allowed to cool. After separation, the gasoline solution was evaporated and 62% yield of ester gum grading H in color was recovered.

*Example 9.*—300 grams of a 14% solution of the above ester gum and 34 grams of resorcinol were refluxed for ½ hour, cooled to room temperature, the gasoline solution separated and washed with 100 cc. of 80% alcohol, followed by 100 cc. of water, the gasoline evaporated giving a 54% yield of ester gum grading I in color.

*Example 10.*—300 grams of the same gasoline solution of ester gum as above, 15 grams of resorcinol and 1 gram of oxalic acid were treated as above yielding 71% of ester gum grading H in color.

*Example 11.*—A process similar to the preceding with the substitution of 1 gram of boric acid for the oxalic acid, yielding 81% of ester gum grading I in color.

*Example 12.*—A process similar to Example 10 above, with the substitution of 1 gram of sodium hydrosulphite for the oxalic acid, gave a 74% yield of ester gum grading H in color.

*Example 13.*—300 grams of the same ester gum solution as above, 20 grams of resorcinol and 1 gram of oxalic acid were refluxed for ½ hour, cooled to 15° C., washed with 80% alcohol, then with water, the gasoline solution separated and evaporated giving a 73% yield of ester gum grading H in color.

*Example 14.*—300 grams of the above solution of ester gum and 40 grams of phenol were heated until a solution occurred. Ten grams of water were added to facilitate the separation, the mixture cooled to 0° C. the gasoline solution removed and evaporated, and 53% yield of ester gum grading H in color was obtained.

*Example 15.*—In a process carried out with glycol ester of rosin grading D in color, 25 parts by weight of the ester were dissolved in 150 parts by weight of gasoline, refluxed for 2 hours with 20 parts by weight of resorcinol, cooled to room temperature, the purified gasoline solution of ester decanted, water washed and evaporated, giving a 54% yield of glycol ester grading I in color.

*Example 16.*—300 parts by weight of the ester gum solution as in the preceding example, 14 parts by weight of resorcinol and 1 part by weight of oxalic acid were refluxed for one hour, cooled to room temperature, the purified gasoline solution of ester decanted, and the solvent evaporated, giving a 71% yield of ester gum grading H in color.

*Example 17.*—In a process similar to the preceding, substituting 1 part by weight of boric acid for the oxalic acid, an 81% yield of ester gum grading I in color was obtained.

*Example 18.*—In a process similar to the preceding, substituting 1 part by weight of sodium hydrosulphite for the oxalic acid, a 74% yield of ester gum grading H in color was obtained.

The processes carried out by treating ethyl abietate grading B in color were as follows:

*Example 19.*—30 grams of crude ethyl abietate were dissolved in gasoline to form a 14% solution and refluxed for 1 hour with 10 grams of resorcinol and .5 gram of oxalic acid, cooled to room temperature, the gasoline solution washed with 100 cc. of 80% alcohol, then water, the gasoline evaporated giving 91.5% yield of ethyl abietate grading K in color.

From the above examples it will be seen that selective solvents used for the purification of rosins may also be used for the purification of rosin esters by the use of reducing agents such as oxalic acid or sodium hydrosulphite. The yields are improved in both quantity and color grading, even though as in the preceding examples the use of these reducing agents is not rendered necessary by the presence of iron. In case iron is present, the use of selective solvents alone is far less effective to give practical refining, the yields of high grade products being small and obtainable only after repeated treatment. However, in case iron is present, the use of oxalic acid, sodium hydrosulphite, or the like will result in proper purification and high yields. This is illustrated by the following examples of processes carried out with glycol esters and glycerin esters of rosin which contained iron.

*Example 20.*—300 grams of a 15% solution of glycol ester of rosin in gasoline grading B in color and 45 grams of resorcinol were refluxed for one hour, cooled to 15° C., the gasoline solution decanted, the gasoline solution then heated for a few minutes with 25 grams of saturated alcoholic oxalic solution. On removal of the gasoline, a 53% yield of a glycol ester grading K in color was obtained.

*Example 21.*—In a process similar to the above except that the resorcinol was dissolved in 30 grams of alcohol and the alcoholic oxalic acid solution was added during the refluxing. A 70% yield of glycol ester of rosin grading K in color was obtained.

*Example 22.*—In a process similar to the above except that .5 gram of oxalic acid was added to the resorcinol without solution in alcohol. An 88% yield of the glycol ester of rosin grading N in color was obtained. Here the treatment was simultaneous.

*Example 23.*—300 grams of the above glycol ester of rosin in gaoline solution and 45 grams of phenol were heated until solution was obtained, 10 grams of water were then added and the mixture cooled to 15° C., the gasoline solution separated and heated with 25 grams of a saturated alcoholic solution of oxalic acid, giving a 65% yield of a glycol ester grading H in color.

*Example 24.*—300 grams of the above glycol ester of rosin in gasoline solution, 14 grams of resorcinol and 1 gram of sodium hydrosulphite were refluxed for one hour, the mixture cooled to room temperature, the gasoline solution drawn off and washed with 100 cc. of 80% alcohol then water, the layers separated, the gasoline evaporated, giving an 87% yield of the glycol ester grading N in color.

*Example 25.*—300 grams of the above glycol ester solution, 14 grams of resorcinol and .5 gram of sodium hydrosulphite were refluxed for ½ hour, cooled to 15° C., washed with 100 cc. of 80% alcohol, then water, the layers separated, the gasoline evaporated giving an 87% yield of glycol ester grading N in color.

*Example 26.*—Substituting phenol for resorcinol in the process indicated in Example 24 above gave a 52% yield of the glycol ester grading G in color.

The following examples illustrate the process as applied to glycerin esters of rosin grading B in color and containing iron.

*Example 27.*—300 grams of a 14% solution of glycerin ester of rosin in gasoline, 30 grams of resorcinol and .5 gram of oxalic acid were refluxed for ½ hour, cooled to 15° C., washed with 80% alcohol then water, the layers separated, the gasoline evaporated giving a 72% yield of glycerin ester grading H in color.

*Example 28.*—The process carried out as above except that the resorcinol dissolved in 10 cc. of alcohol gave a 70% yield of the glycerin ester grading H in color.

*Example 29.*—300 grams of the above glycerin ester solution, 30 grams of phenol and 25 grams of a saturated alcoholic solution of oxalic acid were heated until solution occurred, 5 grams of water added, the mixture cooled to 0° C., the spent alcohol-phenol-oxalic acid mixture drawn off, the gasoline solution washed with 100 cc. of 80% alcohol then with 100 cc. of water, the layers separated, the gasoline evaporated giving a yield of 67% of a glycerin ester grading H in color.

It will be noted that treatment with oxalic acid or sodium hydrosulphite may occur prior to, simultaneous with, or after the selective solvent. It will be seen that rosin esters free from iron may be purified to a high degree by means of selective solvents, the use of reducing agents in said cases increasing the yields. On the other hand, when iron is present, the selective solvents alone, while they produce refining to a certain extent, are not in general able to refine the rosin esters to an effective degree. In this case, accordingly, treatment with oxalic acid, boric acid, sodium hydrosulphite, or the like is preferable to secure the desired degree of purification.

While I have found the said selective solvents to be effective in the refining of rosin esters, I prefer to employ the said solvents in the treatment of polyhydric alcoholic esters of rosin, such as the glycol or glycerin esters of rosin, with which I have found my selective solvents to be very effective.

This application forms a division of application Serial No. 572,731, filed by me November 2, 1931, for Refining of rosin esters.

What I claim and desire to protect by Letters Patent is:

1. The method of refining a rosin ester by the removal of color bodies therefrom which includes extracting a solution of said ester by means of a selective solvent from the group of hydroxyaromatic compounds consisting of phenol and resorcinol.

2. The method of refining a rosin ester by the removal of color bodies therefrom which includes treating a solution of said ester with a material from the group of hydroxyaromatic compounds consisting of phenol and resorcinol, and separating the refined rosin ester from the separated color bodies.

3. The method of refining a rosin ester according to claim 2, characteried by the fact that the rosin ester is treated in solution in a hydrocarbon solvent therefor.

4. The method of refining a rosin ester containing iron and color bodies which includes treating the rosin ester with a reagent capable of reducing iron in ferric form to the ferrous form and simultaneously treating the rosin ester with a material from the group of hydroxyaromatic compounds consisting of phenol and resorcinol, and separating refined rosin ester from the separated color bodies.

5. The method of refining a polyhydric alcohol rosin ester by the removal of color bodies therefrom which includes extracting a solution of said ester by means of a selective solvent from the group of hydroxyaromatic compounds consisting of phenol and resorcinol.

6. The method of refining a polyhydric alcohol rosin ester by the removal of color bodies therefrom which includes treating a solution of said ester with a material from the group of hydroxyaromatic compounds consisting of phenol and resorcinol, and separating the refined rosin ester from the separated color bodies.

7. The method of refining a polyhydric alcohol rosin ester according to claim 6, characteried by the fact that the rosin ester is treated in solution in a hydrocarbon solvent therefor.

8. The method of refining a polyhydric alcohol rosin ester containing iron and color bodies which includes treating the rosin ester with a reagent capable of reducing iron in ferric form to the ferrous form and simultaneously treating the rosin ester with a material from the group of hydroxyaromatic compounds consisting of phenol and resorcinol, and separating refined rosin ester from the separated color bodies.

JOSEPH N. BORGLIN.